United States Patent [19]
Pichette

[11] 3,776,609
[45] Dec. 4, 1973

[54] FLUID-STABILIZED SHAFT
[76] Inventor: Edmond A. Pichette, 14304 San Feliciano Dr., La Mirada, Calif. 90638
[22] Filed: July 13, 1972
[21] Appl. No.: 271,552

[52] U.S. Cl. .................................................. 308/9
[51] Int. Cl. ............................................. F16c 17/16
[58] Field of Search ............................... 308/9, 122

[56] References Cited
UNITED STATES PATENTS
3,606,500  9/1971  Dee........................................ 308/9

Primary Examiner—Charles J. Myhre
Assistant Examiner—Frank Susko
Attorney—D. Gordon Angus et al.

[57] ABSTRACT

A fluid-stabilized shaft assembly wherein the shaft can move axially and/or rotationally under substantial side loads without requiring supplemental lubrication, and without galling. An external, circularly cylindrical bearing surface is provided on the shaft, and the shaft fits with a clearance in a geometrically similar bearing surface in a sleeve. The sleeve is shrink-fitted into a housing so that its outer wall bears against an inner wall of the housing. One of these walls includes a fully peripheral supply groove which receives fluid that is used to stabilize the shaft. A group of restrictor passages of equal length and like cross-sections extend from the supply groove to individual members of two axially spaced-apart sets of balance chambers. Two balance chambers open through the bearing surface of the sleeve, and discharge fluid which is received from the supply groove through the respective ones of the restrictor passages, thereby to provide lateral balancing forces which stabilize the shaft. The bearing surface on the inside of the sleeve is cylindrical and uninterrupted between the sets of balance chambers and also for substantial and equal distances on opposite sides of the two sets of pressure chambers.

7 Claims, 5 Drawing Figures

PATENTED DEC 4 1973 3,776,609
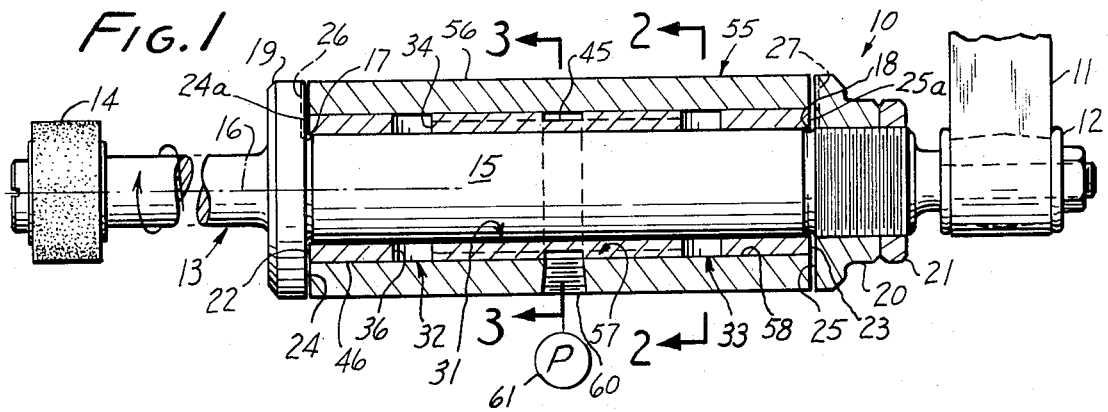
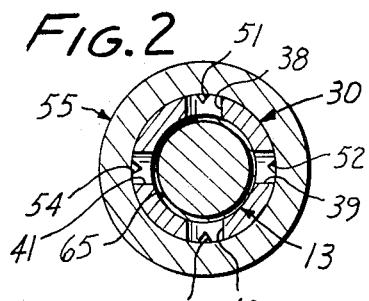
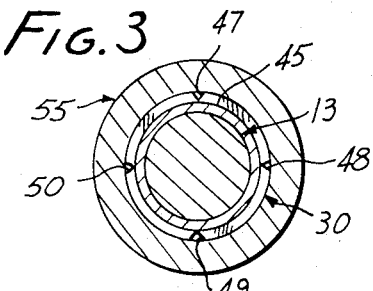
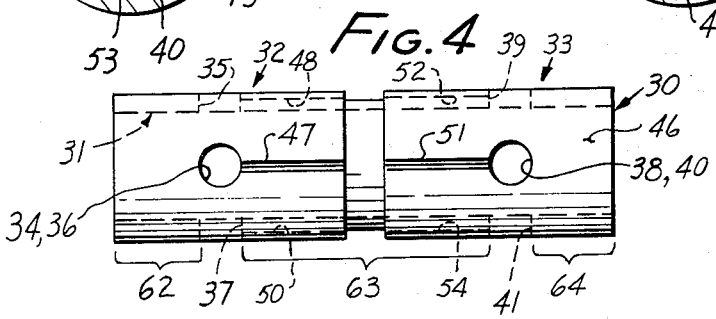
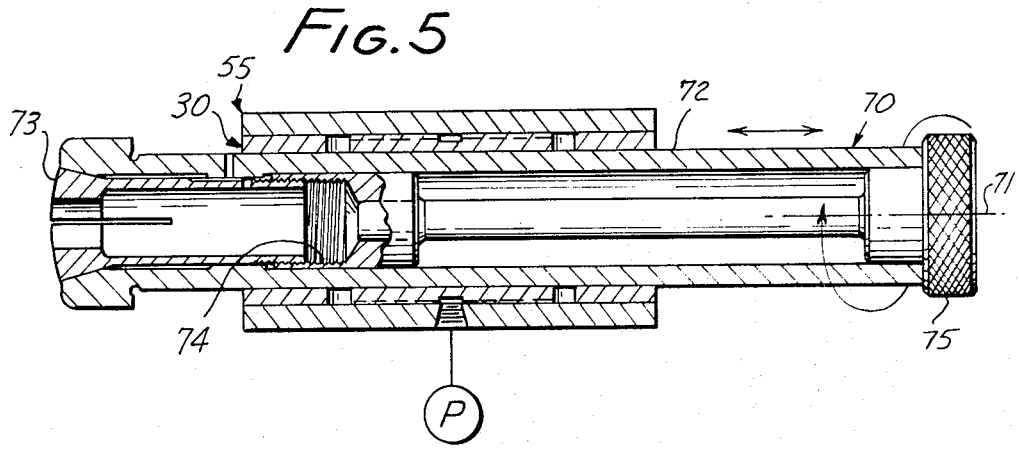

FLUID-STABILIZED SHAFT

This invention relates to a fluid-stablized shaft assembly.

Fluid bearings, such as air bearings, are well known. They do, however, have significant disadvantages which have prevented their commerical utility where reliability is required, but at a relatively low cost. One of the problems inherent in known constructions is the requirement for accuracy in the dimensions of flow components which inherently cannot be achieved at low cost. It has been found that, with this invention, very substantial side and eccentric loads can be resisted by the assembly, and that it may be made of relatively inexpensive materials with conventional manufacturing processes, to produce a rugged and true-running shaft assembly utilizing manufacturing tolerances and techniques of a commerical quality rather than costlier higher tolerances and techniques.

A fluid-stablized shaft assembly according to this invention includes a shaft which has an external, circularly cylindrical bearing surface. A bearing surface is shrink-fitted into a housing, and this sleeve has an internal circularly cylindrical bearing surface whose diameter is greater than that of the bearing surface on the shaft. The housing has an inner wall which embraces an outer wall on the sleeve in a shrink fit. One of these walls has a fully peripheral supply groove from which there branches a plurality of restrictor passages, all of which have the same length and cross-section area, and which connect individually to members of two axially spaced-apart sets of balance chambers that open through the bearing surface of the sleeve.

According to a preferred feature of the invention, the supply groove and the restrictor passages are formed in the external wall of the bearing sleeve and are closed by the wall of the housing. The initial dimensions of the outer wall of the sleeve, when at the same temperature as that of the housing, will be larger, whereupon the housing will be enlarged by heating it, the sleeve fitted into it and permitted to cool down such that their dimensions become the same. This assembly will, however, have been accomplished without exerting cutting, gouging or galling forces on the two parts. The dimensions of the restrictor passages and of the supply groove are not significantly altered, and the passages are not clogged with shavings or the like.

The above and other features of this invention will be fully understood from the following detailed descritpion and the ac-companying drawings in which:

FIG. 1 is an axial view, principally in axial cross-section, of the presently preferred embodiment of the invention;

FIGS. 2 and 3 are cross-sections taken at lines 2-2 and 3—3, respectively, of FIG. 1;

FIG. 4 is an elevational view of a sleeve in FIG. 1; and

FIG. 5 is an axial view, principally in axial cutaway cross-section, showing another embodiment of the invention.

In FIG. 1 there is shown a fluid-stablized shaft assembly 10 according to the invention. It is shown rotationally driven by a belt 11 through a pulley wheel 12 that is attached to a shaft 13. A grinding wheel 14 is shown attached to the left-hand end of FIG. 1 to illustrate a typical use of this shaft assembly.

Shaft 13 includes a bearing surface 15 which has a central axis 16. The bearing surface is circularly cylindrical along this axis. Two relief grooves 17, 18 are provided, one at each end of the bearing surface. At the left-hand end in FIG. 1, a shoulder 19 is formed, and at the other end a nut 20 and a lock nut 21 are brought into position so as to leave a pair of clearances 22, 23 between the opposed faces 24, 25 of the shoulder and the nut. In operation, it is desirable that these clearances remain as close to equal as possible, because then there will be no binding at the ends. In order to reduce any tendency to bind or to chatter, a shallow channel 26, 27 is cut in each of respective ones of these faces so as to provide a supplementary air outflow passage.

It is the object of this invention to hold the shaft, while it rotates (or in another embodiment, slides axially), stablized so that it will not gall or drag in its supporting bearing, and will be stably supported on its central axis against side (lateral) loads. To this end, there is provided a sleeve 30, which sleeve has an internal bearing surface 31. This internal bearing surface is circularly cylindrical and has a diameter larger than the diameter of bearing surface 15. Because the clearance 65 is so small, it is not indicated in any of the drawings except FIG. 2, where it is exaggerated for purposes of illustration. Around a 1-inch diameter shaft, the radial clearance will ordinarily be between about 0.0005 and 0.0015 inches, i.e., a total difference of diameter of between about 0.001 and 0.003 inches.

Two sets 32, 33 of balance chambers are formed in the sleeve, and these sets are axially spaced apart from one another. Sets 32 and 33 are identical so that only set 33 will be described in detail. There are three or more of these balance chambers in each set, and in the illustrated embodiment, there are four. In each set, they lie on a common plane which is normal to the central axis. For example, set 32 includes chambers 34, 35, 36 and 37, and set 33 includes chambers 38, 39, 40 and 41. Most conveniently, these are made as circular holes of equal diameter, drilled through the sleeve, opening with equal areas on the internal bearing surface 31 of the sleeve. As can best be seen in FIG. 2, the members of each set are spaced evenly around the central axis. Each set has the same number of pressure chambers.

A plurality of restrictor passages is formed, extending from a central peripheral supply groove 45, one extending to each pressure chamber. Groove 45 is most conveniently formed in the outer wall 46 of the sleeve 30. As best shown in FIGS. 2 and 3, the restrictor passages are formed as tapered grooves whose depth may conveniently be on the order of 0.010 inches deep with a 45° angle at the bottom. They extend axially from the peripheral supply groove, and all of them are equal in length and in cross-section area. Accordingly, the supply groove is disposed axially in the middle between the two sets of balance chambers. There is one of these restrictor passages for each member of the sets. For example, the members of set 32 are respectively communicated with by restrictor passages 47, 48, 49, 50 (comunicating respectively with balance chambers 34, 35, 36 and 37). Restrictor passages 51, 52, 53 and 54 respectively communicate with balance chambers 38, 39, 40 and 41 (the members of set 33).

A housing 55 surrounds and embraces the sleeve. It includes an outer boundary 56 and an inner cavity 57 which is, at least in part, bounded by an inner circularly cylindrical wall 58. The outer wall of the sleeve has, when out of the housing and at the same temperature of the housing, a diameter which is greater than the internal diameter of wall 58. Accordingly, if one were to try to force the sleeve into the housing, there would be a gouging or a galling effect, and chips, dirt and the like could be caught in the relatively small restrictor passages, changing their relative sizes and upsetting the balance which is required for operating this device.

To avoid this, the assembly is put together by heating the housing so as to enlarge the diameter of cylindrical wall 58 to a diameter larger than that of the outer wall 46. Then the sleeve may simply be dropped into the housing and the two parts permitted to reach the same temperature, at which time their outer diameters will be the same as each other, and the sleeve will be firmly retained. This will bound the supply groove, the restrictor passages and the balance chambers. It will be noted that in so doing there has been no substantial effect on the cross-section area of the restrictor passages or of the balance chambers relative to one another. Certainly, there has been no gouging or peeling of material, and the restrictor passages are open and accurate. This is an important feature of the invention and permits the device to be assembled from relatively less expensive materials, and made with the use of commerical-grade assembly and machining techniques. For example, to make this assembly, it is only necessary to drill holes in the sleeve to form the balance chambers, and a pressure supply port 60, to mill grooves in the outer wall 46 to form the restrictor passages, to form the groove 45, and then to shrink fit the sleeve into the housing. The supply port 60 extends from a source of supply, such as a pump 61, through the housing to communicate with the supply groove 45. In FIG. 1, port 60 passes radially through the housing. It could, instead, feed the supply groove 45 by an axially extending passage or passages (not shown) from a port such as port 60 located at the end of the housing, or at some medial location.

Different materials may be used for the sleeve and for the housing. This is an economy, because the more expensive bearing materials such as steel need not be used for a housing which does not have such requirements. This can constitute a significant savings. For example, the housing may be made of relatively inexpensive material such as aluminum, die cast bakelite, zinc, or pot metal. For use in or around water or salt water, stainless steel or brass might be used.

The selection of sleeve material is determined in part by the fluid which is used, and by the pressure and bearing loads. It should not be porous. If the wall thickness of the sleeve is sufficient for the pressures involved, and if the surface properties of the material are suitable for the mechanical loads involved, even plastic material can be used. Most often, a ferrous bearing material will be used, but obviously one can substitute another material for it to resist the fluid environment if desired. Accordingly, this invention permits economy of construction and adatability to a wide assortment of environments. In the example given, both the housing and the sleeve are made of steel having a substantially equal thermal coefficient of expansion. It is evident that in order for this device to be assembled in accordance with the invention, the material of the sleeve or of the housing must be such that when its temperature is changed (upwardly or downwardly — both being examples of shrink fitting) relative to the other, a clearance is formed which enables the sleeve to be placed in the housing, and then the clearance will disappear when the two parts are at an equal temperaure in the temperature range of intended usage. The term "shrink fit" is used generically to describe both an enlarged housing which reduces in size to grip the sleeve when its temperature is lowered and a chilled sleeve which enlarges upon warming into contact with the housing, the term "shrink fit" thereby being used generically to connote assembly by the usage of thermal differentials.

It will be understood that certain rearrangements of the components of this device may be made. For example, the supply groove and the restrictor passages may be formed in either of walls 46 or 58. However, it is simpler and cheaper to form these components in the outside of a circular sleeve than in the inside of a housing.

With the assembly put together as shown in FIG. 1, there are three axially-extending, fully periperal stabilizing regions 62, 63, 64 in clearance 65. Regions 62 and 64 are on the atmosphere side of the respective sets 32 and 33 of balance chambers. Region 63 lies between them. However, in all of them, stabilizing air flowing into the clearance 65 between the bearing surfaces exerts a lateral pressure, and thereby a centering supporting force on the shaft.

The bearing surfaces are, at least in part, axially aligned. In FIG. 1, where only rotation is provided, they are substantially co-extensive. FIG. 5 shows that the device may be utilized both for axial motion and for rotary motion (alternatively, it could be keyed so as only to shift axially, and not to rotate). The same parts are provided with the same numbers in FIGS. 1 and 5.

In FIG. 5, there is a housing 55 and a sleeve 30 as in FIG. 1. However, the shaft 70 is adapted to move both axially along its axis 71 and rotationally around it. It is shown with a bearing surface 72 having the same relationship to the bearing surface in the sleeve as the shaft of FIG. 1. Similarly, the sleeve and housing in FIG. 5 have the same relationship to each other as those in FIG. 1.

A collet 73 is shown held in the end of the shaft, and a nut 74 engages the collet to shift it axially. It pulls the collet to the right in FIG. 5 to grasp an object, such as a cutting tool (not shown), in order to hold it while being sharpened. This arrangement will enable the tool to be moved in either axial direction, and to be rotated, and is another example of a use for this invention.

The method of operation of the stabilizing feature of this invention is the same in the devices of FIGS. 1 and 5. In FIGS. 1 and 5, the use of air is illustrated for the stablizing fluid. However, it will be recognized that any fluid will do, including liquids. For example, the shaft might be used as a boat propeller shaft, and use water as the stabilizing means, a pump supplying water to the supply groove instead of air. Similarly, in heavy machinery, the shaft may be supplied with oil from the machine's lubrication system.

Certain features of this invention will be evident from the foregoing, including its method of operation. With respect to FIG. 1 it 1, be noted that, when air or other stabilizing fluid s provided to supply groove 45, it will and to flow through every one of the restrictor passages and pass to respective ones of the sets of balance chambers. Now, if the shaft is perfectly centralized in the bearing surface of the sleeve, the pressure drops across all of these restrictor passages will be equal, and the pressures in all of the balance chambers will be equal. If, however, a sie load is applied to the shaft which tends to move the shaft toward one of the balance chambers so as to impede the flow of the fluid out of that balance chamber, then a different situation pertains. It will be found that the pressure will rise in the occluded pressure chamber and will fall in the chamber on the opposite side of the shaft from it. For example, if chamber 36 were particularly occluded, chamber 34 would be more open, and therefore there would be a greater pressure in chamber 36 than in chamber 34, and differential pressure on the shaft would appear which would tend to move the shaft to the central position in keeping with conventional air-bearing considerations. When a different number of balance chambers is used, for example, three, then the pressures will be differently distributed, but the net result will be the same. At least three balance chambers per set will be required in order to give stabilization in all lateral directions. More than four may also be used.

Whatever the fluid used, it will discharge from the balance chambers into the clearance region between the bearing surfaces, and finally flow out past the ends of the bearing sleeve. It will be noted that this is a self-cleaning device and will not clog up, because the stabilizing fluid will cleanse the clearance region as it flows through it. Similarly, in devices such as FIG. 1, where it may be desired to keep the shaft centered in the sleeve, when one end face is closer to the end of the sleeve than the other the pressure will tend to rise in the region of closer approach and drop at the other. There will result a differential force that tends to center the shaft when the clearances are aprporiately selected. To avoid undue sensitivity and chattering from cyclical movement of this kind, the channels 26 and 27 are provided which will bypass a certain amount of the fluid and relieve excessive pressure differentials at the ends. This will prevent excessive axial hunting of the shaft in the sleeve.

This invention thereby provides an inexpensive construction for a stabilized shaft assembly which is very sophisticated in operation. The shaft is strongly centered laterally and is readily manufactured by inexpensive means. The assembly is made by the shrink fit operation described in order that there may be no galling or permanent set of the material to the extent that it would tend to interfere with the accurate relative dimensions of the restrictor passages, which must be identical for the device to work well and have an adequate life.

This invention is not to be limited by the embodiments shown in the drawings and described in the description, which are given by way of example and not of limitation, but only in accordance with the scope of the appended claims.

I claim:

1. A fluid-stablized shaft assembly comprising: a shaft; an external circularly cylindrical bearing surface on said shaft and having a diameter; a sleeve having a shaft passage extending therethrough; an internal circularly cylindrical bearing surface bounding at least a portion of said shaft passage and having a diameter greater than the diameter of the external bearing surface, said bearing surfaces being coaxial on a common central axis, and at least in part being axially coincident; an external peripheral cylindrical wall on said bearing sleeve; a housing having a cavity; an internal peripheral cylindrical wall bounding at least a portion of said cavity, the sleeve being fitted in said internal wall, the diameter of the external wall, when unrestrained by the housing and at the same temperature, being greater than that of the internal wall, but which is shrink-fitted into said internal wall when the walls are at a different temperature, whereby the diameters of said walls become equal when they are in contact and at the same temperature; a fully peripheral supply groove in one of said walls; two axially spaced-apart sets of balance chambers sunk in the internal bearing surface of the sleeve, each set comprising at least three openings of equal area entering into the said internal bearing surface and the members of each set lying in the same plane normal to the central axis and being equally spaced apart around said axis; a plurality of restrictor passages formed in one of said walls and closed by the other of said walls, there being an individual one of the restrictor passages extending from the supply groove to each respective one of the said balance chambers, all of said restrictor passages being of equal length and cross-section area; a port extending through the housing and connecting to said supply groove for supplying fluid to the supply groove, whereby with the fluid supplied under pressure to the supply groove, and with the bearing surfaces being equally spaced apart around their peripheries, fluid flows through the restrictor passages independently of each other to the respective balance chambers, and thence through the clearance between the bearing surfaces, whereby to exert a lateral balancing force on the shaft at the balance chambers.

2. A fluid-stabilized shaft assembly according to claim 1 in which a stabilizing region of substantially equal area is provided on the opposite sides of each of said sets of balnce chambers and which another sad stabilizing region is provided between the sets.

3. A fluid-stabilized shaft assembly according to claim 1 in which a shoulder is mounted to the shaft at each end of the sleeve, the sleeve and each said shoulder having a face facing the other and leaving a spacing therebetween, stabilizing fluid which escapes from the clearance flowing along the spacing between the two faces whereby to center the shaft relative to said faces.

4. A fluid-stabilized shaft assembly according to claim 3 in which a radially extending groove is formed in one of said faces at each end of the sleeve.

5. A fluid-stablized shaft assembly according to claim 1 in which said shaft is rotatable and axially shiftable.

6. A fluid-stabilized shaft assembly according to claim 1 in which the balance chambers comprise holes drilled radially through the sleeve, in which the pressure groove is a peripheral groove formed in the outer wall of the sleeve, and in which the restrictor passages comprise an open groove extending in the outer wall of the sleeve extending between each respective balance chamber and the supply groove.

7. A fluid-stabilized shaft assembly according to claim 6 in which a stabilizing region of substantially equal area is provided on the opposite sides of each of said sets of balance chambers and which another said stabilizing region is provided between the sets.

* * * * *